United States Patent

[11] 3,615,849

| | | |
|---|---|---|
| [72] | Inventor | Andrew Hall<br>Wapping, Conn. |
| [21] | Appl. No. | 834,423 |
| [22] | Filed | June 18, 1969 |
| [45] | Patented | Oct. 26, 1971 |
| [73] | Assignee | United Aircraft Corporation<br>East Hartford, Conn. |

[54] FUEL CELL DIELECTRIC HEAT TRANSFER MEDIUM
5 Claims, 1 Drawing Fig.

[52] U.S. Cl. ................................................... 136/86
[51] Int. Cl. ............................................... H01m 27/12
[50] Field of Search ......................................... 136/86

[56] References Cited
FOREIGN PATENTS
995,557  6/1965  Great Britain .............. 136/86

*Primary Examiner*—Allen B. Curtis
*Assistant Examiner*—H. A. Feeley
*Attorney*—Edmund C. Meisinger

ABSTRACT: A device is disclosed whereby a heat transfer medium is inserted between a fuel cell stack and an attached boiler to improve the heat transfer from the cell stack to the boiler. The medium consists essentially of a porous nonconductive matrix saturated with a dielectric grease.

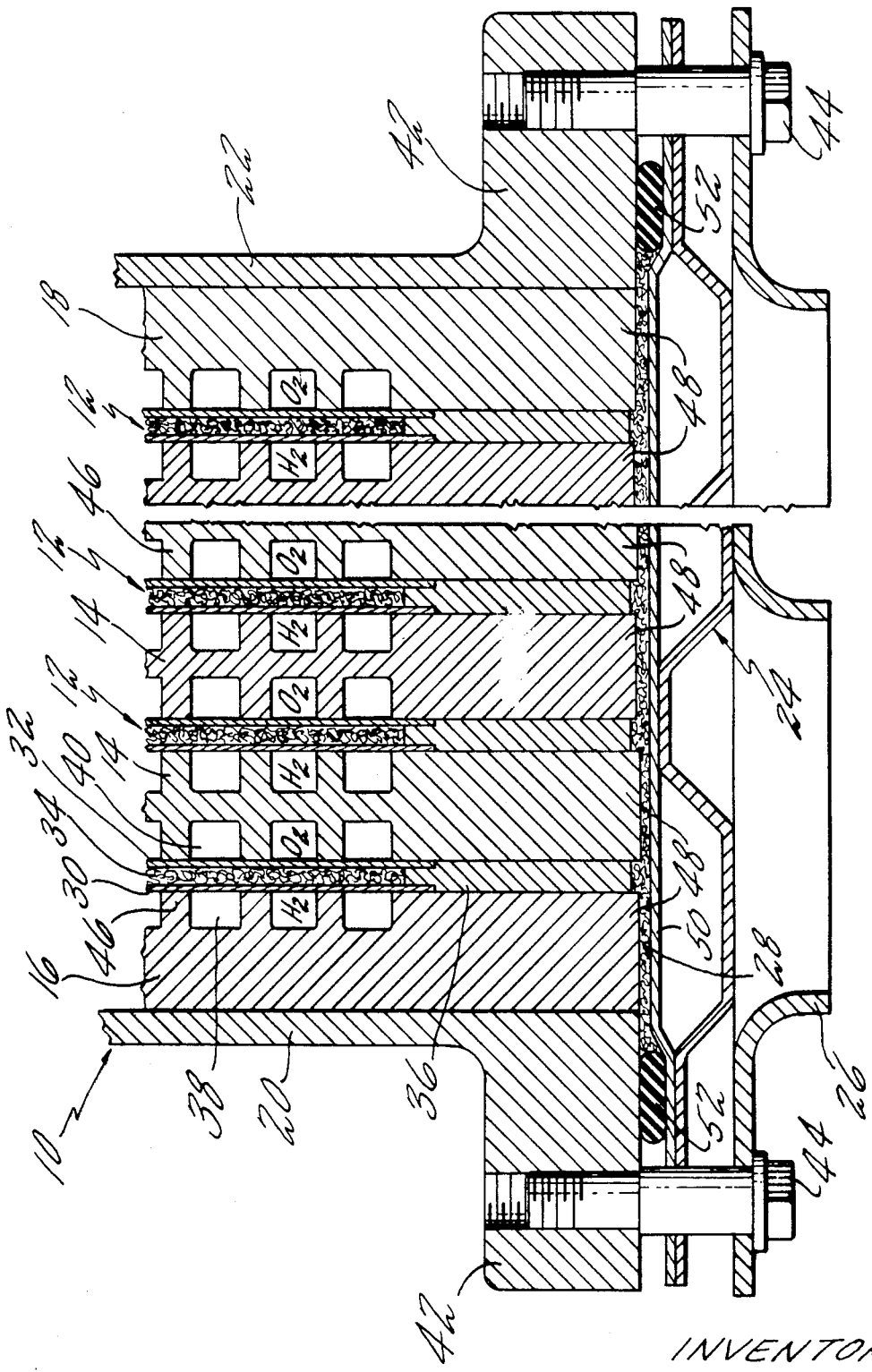

FUEL CELL DIELECTRIC HEAT TRANSFER MEDIUM

BACKGROUND OF THE INVENTION

This invention relates to fuel cell modules and more specifically relates to the removal and utilization of waste heat associated with maintaining cell temperature over a wide range of operating conditions.

Fuel cell performance is dependent upon cell-operating temperatures, reactant pressures and a host of other variables. A variety of cooling schemes have been used to maintain the cell temperature and the proper management of cell waste heat makes for increased overall efficiency. Often, passages in a support or coolant plate have been included between adjacent cells for directing a coolant liquid between the cells in order to remove heat therefrom. Additionally, conductive plates have been interposed between cells whereby heat is conducted outwardly to an external fin arrangement where heat is transferred to the surrounding atmosphere. In the development of a fuel cell power system requiring a steam reformer, preheating or boiling the reformer water using a fuel cell heat removal device appears to have considerable advantage. Directing coolant flow through the cell stack and thereafter to a heat exchanger is inherently somewhat complex. Attaching a boiler directly to a cell stack did not appear satisfactory in that the surface irregularity of the stack did not mate well with the boiler. Air is enclosed at certain points thereby insulating the two surfaces and preventing heat transfer. Even if tight tolerances could be maintained on the stack surface and the boiler surface, the attachment of a boiler would short out the stack.

SUMMARY OF THE INVENTION

It is an object of this invention to provide means for facilitating the flow of heat from a fuel cell stack to an external boiler attached thereto.

Another object of this invention is the provision of a novel heat transfer medium which may be utilized in a fuel cell environment to transfer heat from the cell coolant plates while electrically insulating individual cells from the boiler and from each other in a stack. Another aspect of this invention lies in its ability to adapt to mating of irregular surfaces.

In accordance with this invention, a boiler assembly is mounted against a side of a fuel cell stack and a matrix saturated with a dielectric grease is enclosed therebetween. The matrix is compressed against the irregular surfaces of individual cells or coolant plates in the cell stack. The matrix need only be an electrical nonconductor. The heat is transferred through the dielectric grease from the cell stack to the boiler. Similarly, the dielectric grease is required so that electrical current will not be short circuited between the individual cells or to the boiler. The matrix and grease essentially fill the void between the cell stack and the cooler assembly thereby eliminating trapped air from acting as an insulator between these units. Further, a high-porosity foam plastic sheet, which is compressed on assembly and saturated with a dielectric grease, provides a most satisfactory heat transfer medium.

BRIEF DESCRIPTION OF THE DRAWING

The single FIGURE is a fragmentary sectional view of a fuel cell module having a boiler attached thereto and showing the heat transfer medium.

DESCRIPTION OF THE PREFERRED EMBODIMENT

Referring now to the single figure, a fuel cell module 10 is shown composed of a series of individual cells 12 separated by coolant-separator plates 14 and enclosed at either end by end plates 16 and 18. The end plates are coolant plates adapted for either end of the stack. The individual cells and coolant plates are arranged in stack fashion and retained therein by means of a longitudinal bolting mechanism (not shown) urging the housing plates 20 and 22 together in such fashion as to rigidify the stack of cells and plates. A boiler shown generally as 24 is mounted on at least one side of the stack and may be supported by a backup plate 26 to assure contact against the stack assembly when the boiler extends over a sufficient span. A heat transfer medium 28 is disposed between the boiler and the fuel cell stack.

The fuel cell module is enlarged to illustrate the invention in its intended environment. Each cell 12 consists essentially of an anode 30, a cathode 32, and a matrix 34 containing electrolyte between the electrodes. The fuel cells are generally constructed in a unit and held together in a frame 36. Reactant gases are directed to the anode chambers 38 and the cathode chambers 40 for the electrochemical reaction in the fuel cell as shown, for example, in the Gelting U.S. Pat. No. 3,436,272. These chambers 38 and 40 are commonly provided as part of the end plates 16 and 18, and coolant-separator plates 14. The housing plates 20 and 22 have flanges 42 whereby the boiler backup plate 26 may be mounted by means of bolts 44 to retain the boiler against the fuel cell stack.

The end plates 16 and 18 and coolant plates 14 are thermally and electrically conductive. As heat is generated by the electrochemical reaction of hydrogen and oxygen in the fuel cell, the heat is directed through pegs 46 outwardly through the plates 14, 16 and 18 to the external walls 48 of the plates. The external walls 48 have been somewhat exaggerated but it is apparent that the stack walls have a somewhat irregular surface. The frame 36 of the cells can be designed to be shorter than the separator plates. The heat transfer medium 28 is shown between the ends of the plates and the boiler inner wall 50. A dielectric grease, in and of itself, would be satisfactory in directing the heat outwardly to the water steam boiler. However, a gasket 52 may be provided between the outer periphery of the boiler and the outer periphery of the stack, to retain the grease. Further, the dielectric grease may be retained in a porous nonconductive matrix so that a gasket may not be required. When the boiler is mounted against the stack, the end plates and separator may be pressed into the porous matrix. A matrix with some body provides additional assurance that metal-to-metal contact will not occur when the boiler is mounted against the stack. A thin Teflon sheet, for example, could be inserted between the boiler and the cell stack. However, this sheet acts as a thermal and electrical insulator and would be unsatisfactory. It is evident that the use of a matrix having some body is not essential to the invention but is preferred. It may be found that insulating buttons may be disposed at various points within the periphery of the cell stack to prevent metal-to-metal contact. The matrix need not necessarily encompass the whole surface area along the side of the cell stack. This invention has been shown with respect to a cell stack which has an essentially planar surface. This invention may also be utilized in a cell stack where the configuration has a rounded exterior surface. Thus, the irregular stack surface is also intended to include surfaces that are not planar.

A particularly suitable heat transfer medium consists of a sheet of foam plastic saturated with a dielectric silicone grease which may be, for example, Insulgrease G-640 supplied by the General Electric Company. This medium is typically compressed to about 0.040 inches on assembly. The porous matrix is a convenient tool for containing the grease on assembly and insures against physical contact of the boiler to the stack.

While this invention has been shown and described with respect to a preferred embodiment, it should be understood by those skilled in the art that various changes and omissions in the form and detail may be made therein without departing from the spirit and scope of the invention.

I claim:

1. In a fuel cell module having a plurality of individual electrically connected cells and coolant plates arranged in a stack and a water-steam boiler positioned at least along one side of the stack, the improvement of transferring heat from the cells through the spaced coolant plates to the boiler comprising:
   a dielectric heat transfer member consisting of a porous nonconductive matrix impregnated with a dielectric heat conductive grease interposed between the irregular stack surface and the boiler.

2. The fuel cell module of claim 1, wherein the porous matrix is a foam plastic and the dielectric grease is a silicone grease.

3. A fuel cell module as in claim 1 including a seal between the periphery of the boiler and the perimeter of the adjacent stack surface whereby the heat transfer medium is positively retained.

4. A fuel cell as in claim 1, wherein the heat transfer member is a porous foam-plastic sheet compressed to about 0.040 inches on assembly and impregnated with a dielectric silicone grease.

5. A fuel cell stack having a plurality of cells separated by a plurality of coolant plates and an externally mounted water-steam boiler spaced from said stack by electrical insulating means, the improvement which comprises a dielectric heat conductive grease disposed between the boiler and the stack.

* * * * *